O. STOTT AND E. R. JONES.
AERATION OF SEWAGE AND OTHER IMPURE LIQUIDS.
APPLICATION FILED JUNE 21, 1919.

1,343,797.

Patented June 15, 1920.

UNITED STATES PATENT OFFICE.

OSWALD STOTT, OF BIRMINGHAM, AND ERNEST REGINALD JONES, OF STOURBRIDGE, ENGLAND.

AERATION OF SEWAGE AND OTHER IMPURE LIQUIDS.

1,343,797. Specification of Letters Patent. Patented June 15, 1920.

Application filed June 21, 1919. Serial No. 305,885.

*To all whom it may concern:*

Be it known that we, OSWALD STOTT and ERNEST REGINALD JONES, subjects of the King of England, residing at Birmingham, in the county of Warwick, England, and Stourbridge, in the county of Worcester, England, respectively, have invented new and useful Improvements in and Connected with the Aeration of Sewage and other Impure Liquids, of which the following is a specificaton.

This invention has reference to the aeration and purification of sewage and other impure liquids, that is to say processes for the purification of sewage in tanks of the usual or known kinds, in which air is employed to act upon the sewage in conjunction with sludge containing aerobic bacteria and effect the breaking down of the impurities and its purification generally, as takes place in the process known as the "activated sludge process."

The commercial feasibility and practicability of processes for the purification or treatment of sewage or other impure liquids of this character depend upon, or are governed largely by, the cost of working, which in the case of the said aeration processes, depends largely upon the cost of the power necessary for the introduction of the air to the liquid, which constitutes a large proportion of the running cost of working the process; and according to this invention the task of aerating the sludge and bacteria contained in the liquid at a relatively low cost, which is one of the primary objects of the invention, is rendered possible by the reduction which is effected by it in the power employed. There are two characteristics in the present process and invention—which however are not necessarily always employed in connection with each other—by which this end is accomplished. One is the introduction of the air to the liquid and its bacterial sludge contents at or near its free surface, by mechanically acting upon and circulating it in the manner hereinafter described; and the other is that of rendering the time or duration of contact of the air with the liquid relatively great; the longer, within limits, such contact is maintained, the greater being the effect proportionately of the air upon the liquid and its contents.

With regard to the feature of introducing the air to the liquid and bacterial sludge contents at or near its free surface, we find that by mechanically acting upon the liquid, so as to put it into circulation and motion as described, and more or less rapidly, and so as to artifically bring it into contact with air at its surface, in order that the aeration of the sludge and bacteria be readily aerated through the purification of the liquid is rapidly effected; and not only is the liquid brought into contact with the air at its surface in its movement within the tank (which may be any direction or directions), but air will be carried down into the liquid near its surface, and circulated as described, by this mechanical action upon it; and in addition to this, if the surface of liquid will become ruffled, or broken, or splashing is produced, this causes air to be taken up by, and carried down into the liquid, or accentuate or increase the amount and rapidity of the contacting of the liquid and air, and thereby promotes rapid purification, in so far that the purifying bacteria in the sludge and liquid will thereby be furnished with the amount of air neecssary to keep them constantly in a vigorous and highly active state.

It will be seen therefore, that by this mechanical action upon the liquid, and its artificial movement or circulation, in the manner described air in sufficient quantities for rapid purification, is introduced to the liquid at or near its surface; and as power required to operate the liquid moving or circulating means, is small, the cost of treating and operating upon the sewage or other liquid is small.

Therefore, in this connection, whether the process be carried out in a tank of a kind suitable to the "activated sludge process" which is alternately filled, the liquid treated, and emptied, (and subsequently the sludge and the solid matters separated in a settling tank or the like); or, introduced continuously or intermittently continuously, and continuously or intermittently discharged, by this mechanical action the liquid and its bacterial sludge contents throughout are artificially brought into contact with air and purified, and in a very simple way, and at a low cost.

With regard to causing the duration of contact of the air with the liquid to be increased or rendered relatively great, this is effected very efficiently and economically by causing bubbles of air to be introduced into the liquid at or near its surface by mechanically acting upon its surface only, and to be carried down and through the liquid, and the liquid to be carried over the bottom of the tank more or less so as to prevent deposit of sludge or stagnation of same, which is detrimental to the process; and the mechanical circulating effect is advantageously effected in tanks of considerable size such as are used in the activated sludge process, by employing circulating means acting at its surface in a plurality of points, preferably throughout the length of the tank.

To keep relatively large bubbles of air in the liquid, it must have at least, a minimum velocity, say for example one to three feet per second. This velocity will carry the bubbles along horizontally near the surface or upper stratum of liquid, and down to or toward the bottom, and throughout the liquid in an effective manner.

A diagrammatic illustration of the method of mechanically moving and circulating the liquid by operating upon it at its free surface only, is shown in Fig. 1. It may be assumed that the continuous method of treatment is employed, and that the view is a transverse section of a tank; and a driven mechanical feathering float type of paddle wheel 1 is employed for acting upon and moving the liquid. The wheel 1 may be driven by any suitable mechanical means, as for example, the power machine 6 connected with the paddle wheel by belt 7. In such cases, we find that by using a partial partition 2, and a plate 3 directly under the paddle wheel, the power required to move the liquid is reduced, as the plate 3 avoids eddies and counter currents, and loss of power due to them, and they direct or control the course of circulation and cause the liquid to sweep over the bottom of the tank, and so prevent deposit and stagnation of sludge, which as above stated, is detrimental to the process.

Figure 1:
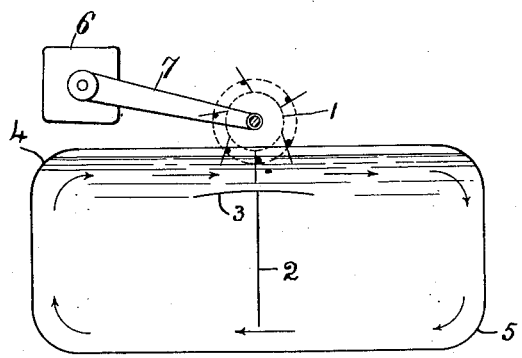
Figure 2:
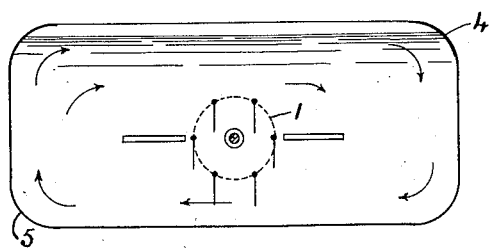
Fig. 2 shows a tank in which the liquid moving or circulating means is submerged, it being of any known suitable kind the driving means being omitted.
Figure 3:
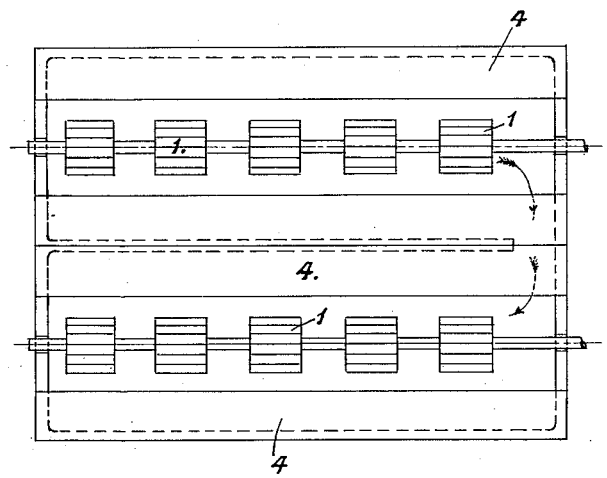
Fig. 3 is a plan view, showing a plurality of propellers the driving means being omitted.

As regards the initial cost of a purifying plant or installation according to this invention, this is rendered relatively small by it.

While the moving or circulating means in the drawings have been described as disposed with their axes parallel with the direction of length of the tank, they may be disposed at right angles to such direction, in some cases.

In cases where air is introduced into the liquid in the form of bubbles, and the liquid circulated by mechanical means acting at or near its surface, these means may consist of paddles, arms, screws, propellers, or like devices—electrically or otherwise driven—the movement of which in or on the liquid causes the introduction of air into it, and this may take place directly by their mechanical action, or indirectly due to the agitation, splashing, suction, ruffling, or other like action of the liquid.

In the case where a mechanical means is used solely or mainly to move or circulate the liquid, and air is introduced into and distributed in the liquid at or near its surface by forcing it through distributing conduits or means in the upper part of the liquid, by an ordinary centrifugal or rotary fan or blower, as the head of liquid against the entrance of air is very small the cost of power is small and the use of a simple and inexpensive type of air moving machine is rendered possible.

Generally, as regards the mode of introducing air to the liquid, this will vary according to circumstances. For instance, in the case where the general movement or circulation of the liquid is effected by mechanical moving or forcing means, which artificially circulates the liquid and its bacterial sludge contents through or in the tank in such a manner as to bring all parts of same into contact with air at or near the surface, whether there be actual splashing or like action, or not, this artificial, and more or less rapid movement or circulation of the liquid throughout the tank, will more or less rapidly cause or produce aeration and purification of the liquid; and to promote this, the bottom or surfaces of the tank over which the liquid is caused to sweep or flow may be undulating or inclined.

The tanks may in some cases be partially roofed over, and rounded at parts so as to direct the current from a horizontal or transverse direction to a vertical or downward direction, and from the vertical to the horizontal at the bottom or floor, over which it will sweep at the desired velocity. This form of tank is illustrated in the drawings, in which 4 are the partial roof rounded portions at the upper corners or sides of the tank, and 5 the lower rounded corners, so as to direct the current as stated.

By this form of tank, the air bubbles introduced at or near the surface of the liquid, may be made to remain in circulation in the liquid for a more or less prolonged period of time according to the design and arrangement, and the desiderata of different applications of the invention. It will be seen as regards the manner of circulating, as shown in Fig. 1, that in acting on the surface of the liquid only, it sets the whole body of liquid in circulation on each side of the partial partition or wall 2, as the internal portion or core of liquid on each side of this partition will be set in circulation and form liquid circuits by the action of the liquid flowing over and near the walls or surfaces, namely, sides and bottom of the tank.

What is claimed is:—

1. In processes of purifying sewage and other impure liquids in which the purification is effected by bacterial sludge and air, artificially circulating the sewage or liquid by acting upon the surface only of the liquid, and at the same time ruffling or agitating the surface, so as to cause the introduction of air into the liquid by said ruffling or agitation.

2. In processes of purifying sewage and other impure liquids in which the purification is effected by bacterial sludge and air, artificially circulating the sewage or liquid by acting upon the surface only of the liquid by a propeller, and at the same time ruffling or agitating the surface thereby, so as to cause the introduction of air into the liquid by said ruffling or agitation, and causing the air so engaged by the liquid to be carried into the lower portion of the liquid body by said circulating means; substantially as described.

3. In processes of purifying sewage and other impure liquids in which the purification is effected by bacterial sludge and air, artificially circulating the sewage or liquid by a feathering type of bladed propeller adapted to act upon the surface only of the liquid; substantially as set forth.

4. In processes of purifying sewage and other impure liquids in which the purification is effected by bacterial sludge and air, artificially circulating the sewage or liquid by means adapted to act on the surface only of the liquid, simultaneously agitating such surface to cause the introduction of air into said liquid, and controlling the circulation of the liquid to direct the travel of such introduced air.

5. In processes of purifying sewage and other impure liquids in which the purification is effected by bacterial sludge and air introduced into it at the surface of the liquid, artificially circulating the sewage or liquid by a plurality of propellers in series extending in the direction of length of, and practically for the full length of the purifying tank; substantially as set forth.

6. In processes of purifying sewage and other impure liquids in which the purification is effected by bacterial sludge and air introduced into it at the surface of the liquid, artificially circulating the sewage or liquid by a plurality of propellers in series extending along the surface of the liquid in the tank for practically the full length of the tank, and so arranged and adapted as to cause the liquid and air in it to pass down to the lower part of the tank and over the bottom thereof; substantially as set forth.

In testimony whereof we have signed our names to this specification in the presence of two subscribing witnesses.

OSWALD STOTT.
ERNEST REGINALD JONES.

Witnesses:
 FRANCIS EDWARD CALE,
 ALFRED WHEELER.